(12) United States Patent
Martinek

(10) Patent No.: US 6,238,294 B1
(45) Date of Patent: May 29, 2001

(54) TORSIONAL VIBRATION DAMPER OR TORSIONALLY ELASTIC COUPLING

(75) Inventor: Felix Martinek, Henndorf (AT)

(73) Assignee: Ellergon Antriebstechnik GmbH, Hallwang/Salzburg (AT)

(*) Notice: Subject to any disclaimer, the term of this patent is extended or adjusted under 35 U.S.C. 154(b) by 0 days.

(21) Appl. No.: 09/307,050

(22) Filed: May 7, 1999

(30) Foreign Application Priority Data

May 8, 1998 (AT) ........................................ 776/98

(51) Int. Cl.[7] ........................................... F16D 3/52
(52) U.S. Cl. ........................ 464/100; 464/101; 188/290; 192/208
(58) Field of Search ........................ 74/574; 464/24, 464/28, 100, 82, 101; 188/290, 293; 192/208, 55.4

(56) References Cited

U.S. PATENT DOCUMENTS

| | | | |
|---|---|---|---|
| 1,652,520 | * 12/1927 | Eaton | 464/82 |
| 3,534,839 | * 10/1970 | Campbell et al. | 192/79 |
| 3,996,767 | * 12/1976 | Geislinger | 464/82 |
| 4,104,891 | * 8/1978 | Geislinger | 464/24 |
| 4,307,585 | * 12/1981 | Chivari | 464/82 |
| 5,364,308 | * 11/1994 | Vollet | 464/82 |

FOREIGN PATENT DOCUMENTS

| | | |
|---|---|---|
| 332668 | 10/1976 | (AT) . |
| 3033302 | 12/1988 | (DE) . |
| 2250569 | 8/1994 | (GB) . |

* cited by examiner

Primary Examiner—Lynne H. Browne
Assistant Examiner—Aaron Dunwoody
(74) Attorney, Agent, or Firm—Collard & Roe, P.C.

(57) ABSTRACT

A torsional vibration damper or torsionally elastic coupling comprises an inner portion, an outer portion, and radial leaf spring assemblies extending between the inner and outer portions. Each leaf spring assembly is clamped in a clamping area between adapters at one end of the leaf spring assembly and includes two leaf springs fixed to the outer portion at the one end and having their opposite ends engage in axial grooves of the inner portion. The two leaf springs protrude radially inwards from the clamping area up to the opposite ends engaged in the axial grooves and, to reduce wear phenomena and to improve the load-bearing capacity of the leaf springs for torque transmission, they define a free clearance of movement from the clamping area to the axial grooves.

3 Claims, 2 Drawing Sheets

TORSIONAL VIBRATION DAMPER OR TORSIONALLY ELASTIC COUPLING

FIELD OF THE INVENTION

This invention relates to a torsional vibration damper or a torsionally elastic coupling, comprising an inner portion and an outer portion and radial leaf spring assemblies between inner portion and outer portion, where the leaf spring assemblies each include two leaf springs, and at the one end are clamped between adapters and are fixed at the outer portion, and at the other end engage in axial grooves of the inner portion.

DESCRIPTION OF THE PRIOR ART

In these dampers or couplings the leaf spring assemblies are used for torque transmission and due to their spring-elastic properties at the same time allow to influence the occurring torsional vibrations. The spring assemblies are firmly clamped into the outer portion, but to compensate occurring relative movements between inner portion and outer portion, their inner ends engage only loosely into the axial grooves of the inner portion, where in this case the introduction of force is effected via the groove flanks and the abutting spring ends. In the case of torsional vibrations there are relative movements both between the groove flanks and the abutting spring ends and between the individual leaf springs of the spring assemblies, where the leaf springs of a spring assembly, which are directly abutting against each other, are subjected to an alternating bending load due to the torsional vibrations, which impairs the load-bearing capacity of the springs and their service life and in the areas of contact leads to considerable wear phenomena. To improve these friction and wear conditions between the leaf springs, it has also been proposed already to separate the individual leaf springs from each other by means insertion plates made of bronze or a similar sliding material, which insertion plates substantially extend over the entire length of a leaf spring and lead to a certain improvement of the friction and wear behavior, but cannot reduce the alternating load of the leaf springs and can hardly contribute to a prolongation of the service life and an increased utilization of the spring.

It is therefore the object underlying the invention to create a torsional vibration damper or a torsionally elastic coupling as described above, which with simple means provides for an increase in the degree of spring utilization while at the same time reducing the frictional forces and the risk of wear.

SUMMARY OF THE INVENTION

This object is solved by the invention in that the two leaf springs of the leaf spring assemblies protrude radially inwards from the clamping area up to the ends engaging in the axial grooves by maintaining a mutual free clearance of movement. Due to the free clearance of movement between the individual leaf springs, always only the one leaf spring abutting against the groove flanks is subjected to a bending load in the case of a relative rotation between inner portion and outer portion, whereas the other leaf spring is lifted off the groove flank and remains free from load. Depending on the respective direction of vibration, torsional vibrations accordingly cause a bending of the one spring and then a bending of the other spring, so that the individual leaf springs are always only subjected to an increasing bending load, but never to an alternating bending load. Since in addition the two inwardly protruding leaf springs remain without mutual contact, no frictional forces occur between the same, and also the wear phenomena are restricted to the area where the spring ends engage in the axial grooves. Since there is no alternating bending load of the leaf springs, the springs themselves can be utilized more effectively and provide for taking up or transmitting larger forces, and thus lead to a comparatively smaller design.

To ensure the free clearance of movement between the leaf springs, the leaf springs can have a correspondingly wedge-shaped tapered cross-section along their length starting from the clamping area, but the two leaf springs of the leaf spring assemblies can also be separated from each other by insertion plates merely extending over the clamping area. These insertion plates then serve as spacers between the leaf springs and allow to adapt the size of the mutual spring distance to different conditions.

When between the adapters and the leaf springs of the leaf spring assemblies there are furthermore inserted insertion plates extending merely over the clamping area, these insertion plates can influence the respective distance between the leaf springs and the adapters mostly protruding up to shortly before the surface area of the inner portion so as to form throttle gaps, and even with a continuous radial extension of the adjacent side faces of adapters and leaf springs can ensure the required clearance between adapters and leaf springs.

BRIEF DESCRIPTION OF THE DRAWING

In the drawing, the subject-matter of the invention is illustrated in detail, wherein.

DESCRIPTION OF THE PREFERRED EMBODIMENT

Figure 1:
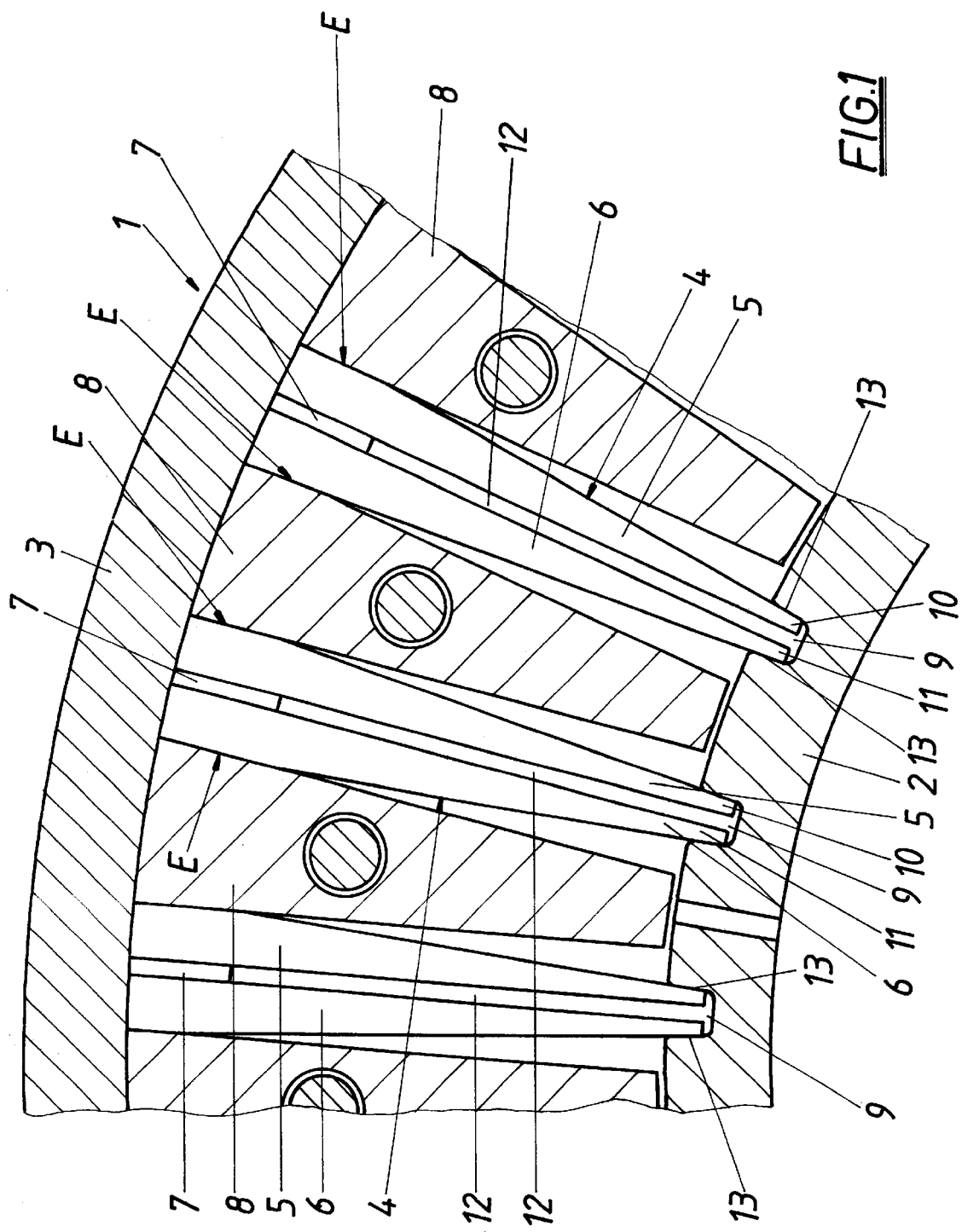
FIG. 1 shows a segment of an inventive damper or an inventive coupling in a cross-section.

A torsional vibration damper or a torsionally elastic coupling 1 comprises an inner portion 2, an outer portion 3 and radial leaf spring assemblies 4 between inner and outer portions 2, 3 for torque transmission. The leaf spring assemblies 4 each consist of two individual leaf springs 5, 6, which in accordance with the embodiment shown in FIG. 1 are separated from each other by an insertion plate 7. At the one end, the leaf spring assemblies 4 are clamped between adapters 8 and are fixed at the outer portion 3, and at the other end they engage in axial grooves 9 of the inner portion 2. However, the insertion plates 7 merely extend over the clamping area E of the leaf spring assemblies 4, and the leaf springs 5, 6 freely protrude from the clamping area radially inwards to the ends 10, 11 engaging in the axial grooves 9, where a mutual clearance of movement 12 is maintained. During the torque transmission, the leaf springs 5, 6 of the leaf spring assemblies 4 thus act like individual springs, where in the case of a clockwise relative rotation of the outer portion 3 with respect to the inner portion 2 only the leaf springs 5 abut against the groove flanks 13 with their ends 10, whereas the ends 11 of the leaf springs 6 are lifted off the groove flanks 13, and conversely, in the case of a counter-clockwise relative rotation the leaf springs 6 are abutting and the leaf springs 5 are lifted off, which alternatingly always applies a bending load only to the leaf springs 5 or to the leaf springs 6. There is no alternating bending load of the leaf springs, there are no frictional forces due to the free clearance of movement 12 between the individual leaf springs, and thus there are no wear phenomena in this area. The leaf springs merely subjected to a dynamic bending load can be optimally utilized as regards their spring properties and therefore allow a comparatively smaller design of the damper or the coupling.

Figure 2:
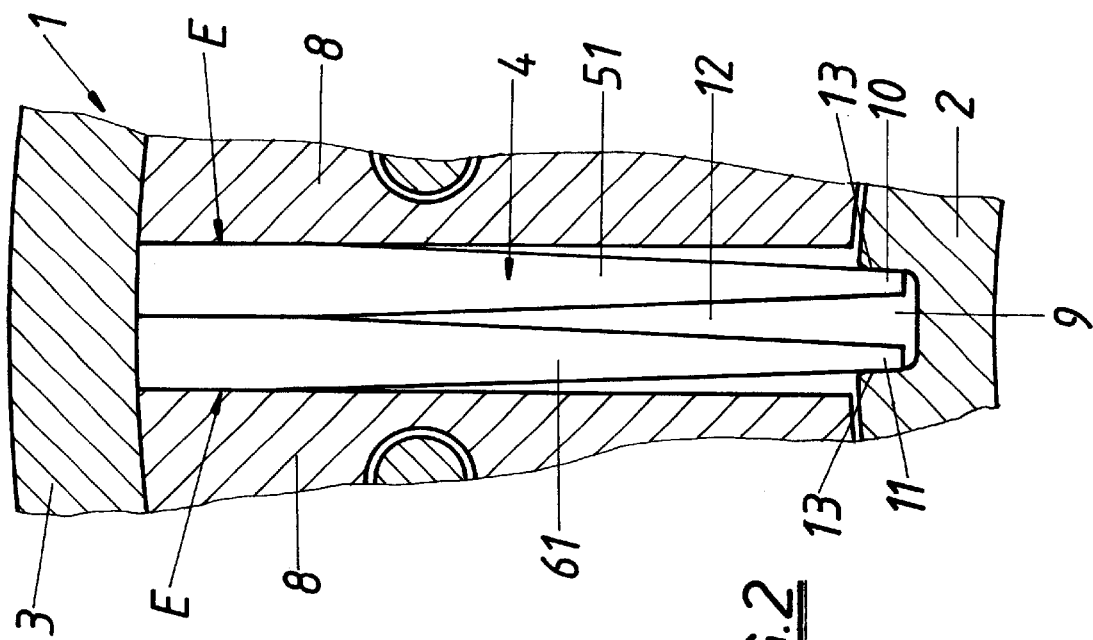
FIGS. 2 and 3 show segments of two modified embodiments of an inventive damper or an inventive coupling.

To achieve the desired clearance of movement 12 for the leaf springs, the leaf springs 51, 61 can have, as is indicated in FIG. 2, a wedge-shaped cross-section tapered radially inwards, so that due to the spring cross-sections the freedom of movement of the leaf springs, which is required to avoid alternating bending loads, is ensured even without insertion plates, where due to the double wedge shape of the cross-sections the necessary clearance is also ensured with respect to the adapters 8.

Figure 3:
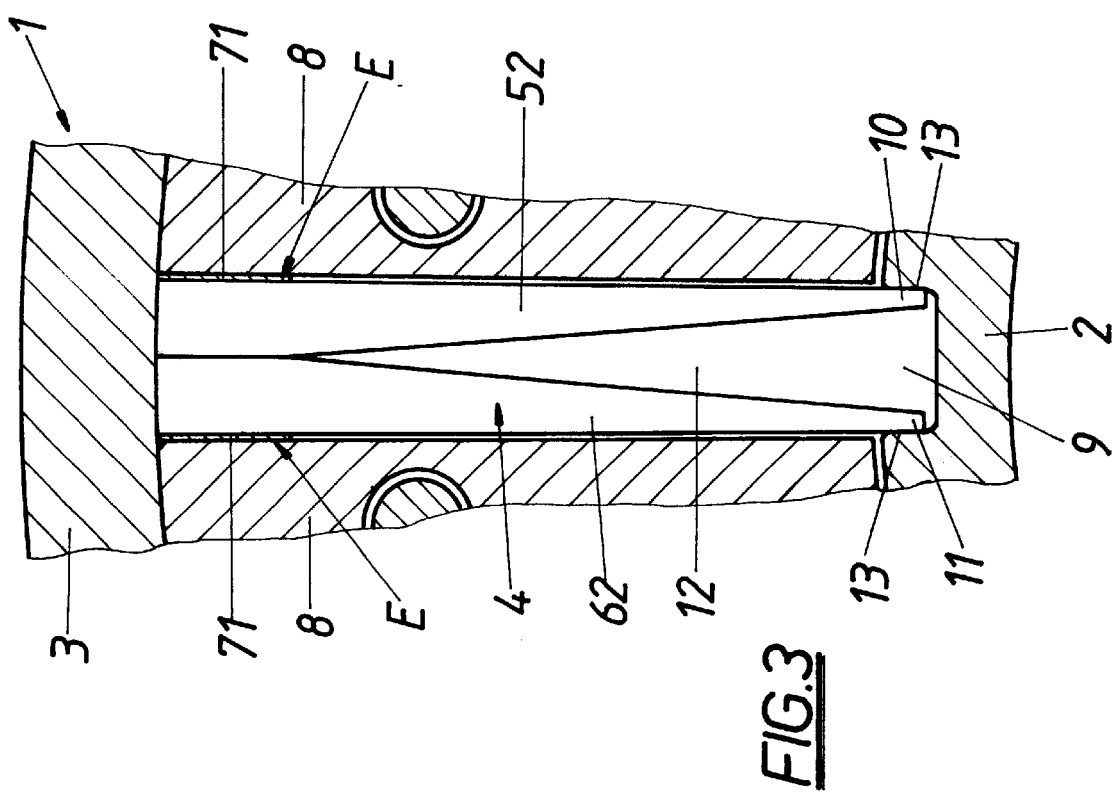

In accordance with the embodiment shown in FIG. 3, the leaf springs 52, 62 of the leaf spring assemblies 4 are likewise directly clamped together in the clamping area E, but starting from the clamping area E they only have a simply wedge-shaped tapered cross-section along their length, where the wedge faces of the leaf springs are facing each other and form the clearance of movement 12 between the leaf springs. To obtain the clearance requiring the spring movement between the continuously radially extending, adjacent side faces of the leaf springs 52, 62 and the adapters 8, insertion plates 71 are inserted between the adapters 8 and the leaf springs 52, 62, which insertion plates in turn merely extend over the clamping area E.

What is claimed is:

1. A torsional vibration damper or torsionally elastic coupling, comprising (a) an inner portion, (b) an outer portion, and (c) radial leaf spring assemblies extending between the inner and outer portions, each leaf spring assembly being clamped in a clamping area between adapters at one end of the leaf spring assembly and including (1) two leaf springs fixed to the outer portion at the one end and having their opposite ends engage in axial grooves of the inner portion, the two leaf springs protruding radially inwards from the clamping area up to the opposite ends engaged in the axial grooves and defining a free clearance of movement beginning at the clamping area and extending to the axial grooves.

2. The torsional vibration damper or torsionally elastic coupling of claim 1, wherein the leaf spring assembly further comprises an insertion plate separating the two leaf springs, the insertion plate extending merely over the clamping area.

3. The torsional vibration damper or torsionally elastic coupling of claim 1, further comprising insertion plates extending between the adapters and a respective one of the leaf springs, the insertion plates extending merely over the clamping area.

* * * * *